(12) United States Patent
Hempert et al.

(10) Patent No.: US 12,472,915 B2
(45) Date of Patent: Nov. 18, 2025

(54) CONTROLLED DECELERATION FOR PARKING OF A VEHICLE

(71) Applicant: Robert Bosch GmbH, Stuttgart (DE)

(72) Inventors: Fabian Hempert, Benningen am Neckar (DE); Frank Matthias Baehrle-Miller, Schoenaich (DE); Joseph J. Anderson, Northville, MI (US); Benjamin Heer, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 184 days.

(21) Appl. No.: 18/313,222

(22) Filed: May 5, 2023

(65) Prior Publication Data
US 2024/0367628 A1   Nov. 7, 2024

(51) Int. Cl.
*B60T 8/32* (2006.01)
*B60T 13/74* (2006.01)

(52) U.S. Cl.
CPC ............ *B60T 8/326* (2013.01); *B60T 8/329* (2013.01); *B60T 13/745* (2013.01); *B60T 2250/04* (2013.01)

(58) Field of Classification Search
CPC ........ B60T 8/326; B60T 8/329; B60T 13/745; B60T 2250/04; B60T 7/042; B60T 13/662; B60T 13/686
See application file for complete search history.

(56) References Cited

U.S. PATENT DOCUMENTS

| | | | |
|---|---|---|---|
| 8,985,711 B2 * | 3/2015 | Tomczak | B60T 13/662 188/106 P |
| 9,428,159 B2 | 8/2016 | Heise et al. | |
| 11,021,141 B2 | 6/2021 | Jeong et al. | |
| 11,332,107 B2 | 5/2022 | Kim | |
| 2009/0242694 A1 * | 10/2009 | Oyama | B64C 25/50 244/99.6 |
| 2011/0168502 A1 | 7/2011 | Linhoff et al. | |
| 2015/0266459 A1 * | 9/2015 | Gates | B60T 7/122 180/282 |

(Continued)

FOREIGN PATENT DOCUMENTS

WO   WO-2023146354 A1 *   8/2023   ............ B60T 13/66

*Primary Examiner* — Joseph J Dallo
(74) *Attorney, Agent, or Firm* — Michael Best & Friedrich LLP (57) ABSTRACT

Examples provide a system and method for controlled deceleration for parking a vehicle. The system includes a parking brake control device, a sensor configured to measure a speed of the vehicle and output a measured vehicle speed, a parking brake, a primary hydraulic system including a primary controller and a primary hydraulic pressure generator, and a secondary hydraulic system including a secondary controller and a secondary hydraulic pressure generator. The secondary controller is configured to determine whether the vehicle is travelling at a non-zero speed while the parking brake control device is actuated. In response to that determination, the secondary controller determines whether hydraulic braking via the primary hydraulic system is available. When hydraulic braking via the primary hydraulic system is not available, the secondary controller controls the secondary hydraulic pressure generator to generate hydraulic braking pressure.

20 Claims, 4 Drawing Sheets

(56) References Cited

U.S. PATENT DOCUMENTS

| | | | |
|---|---|---|---|
| 2016/0052494 A1* | 2/2016 | Yamamoto | B60T 8/4872 |
| | | | 701/70 |
| 2018/0126969 A1* | 5/2018 | Blattert | B60T 13/745 |
| 2018/0272872 A1* | 9/2018 | Okano | B60T 8/4077 |
| 2019/0184949 A1* | 6/2019 | Maximiuc | B60T 13/741 |
| 2020/0062231 A1* | 2/2020 | Micke | F16H 25/20 |
| 2021/0179051 A1 | 6/2021 | Alford et al. | |
| 2021/0370899 A1* | 12/2021 | Hwang | B60L 7/26 |
| 2021/0394728 A1* | 12/2021 | Yoo | B60T 8/4081 |
| 2022/0289162 A1 | 9/2022 | Lee et al. | |
| 2023/0009546 A1* | 1/2023 | Ahn | B60T 13/662 |
| 2023/0086943 A1* | 3/2023 | Ullrich | B60T 13/72 |
| | | | 303/3 |
| 2023/0144112 A1* | 5/2023 | Lim | B60T 13/686 |
| | | | 303/2 |

\* cited by examiner

CONTROLLED DECELERATION FOR PARKING OF A VEHICLE

FIELD

Embodiments, examples, and aspects described herein relate to, among other things, a system and method for controlled deceleration for parking of a vehicle.

SUMMARY

When a parking brake button in a vehicle is actuated while the vehicle is moving, an electronic stability control system having a hydraulic pressure generator may control the vehicle to decelerate to a standstill. In the event of failure in the electronic stability control system, a mechanical parking brake decelerates the vehicle without hydraulics. Mechanical deceleration may be less stable than hydraulic deceleration.

Thus, examples described herein provide a system for controlled deceleration for parking a vehicle. The system includes a parking brake control, a sensor configured to measure a speed of the vehicle and output a measured vehicle speed, a parking brake, a primary hydraulic system, and a secondary hydraulic system. The primary hydraulic system includes a primary controller and a primary hydraulic pressure generator. The secondary hydraulic system includes a secondary hydraulic system including a secondary controller and a secondary hydraulic pressure generator. The secondary controller is configured to determine whether the vehicle is travelling at a non-zero speed while the parking brake control is actuated. In response to determining that the vehicle is travelling at a non-zero speed while the parking brake control is actuated, the secondary controller determines whether hydraulic braking using the primary hydraulic system is available. In response to determining that hydraulic braking using the primary hydraulic system is not available, the secondary controller controls the secondary hydraulic pressure generator to generate hydraulic braking pressure.

In some aspects, the primary hydraulic system includes an electronic stability control system, and the primary controller includes an electronic stability controller.

In some aspects, the secondary hydraulic system includes an electronic brake booster, and the secondary controller includes a decoupled power brake controller.

In some aspects, the secondary controller is further configured to determine, based on a signal received from the primary controller indicative of a measured speed of the vehicle, whether the measured vehicle speed is approximately zero, and in response to determining that the measured vehicle speed is approximately zero, control the parking brake to brake the vehicle.

In some aspects, the secondary controller is configured to determine that hydraulic braking using the primary hydraulic system is not available based on a signal received from the primary controller indicating a fault condition associated with the primary hydraulic system.

In some aspects, the secondary controller is configured to determine that hydraulic braking using the primary hydraulic system is not available in response to receiving no signal from the primary controller.

In some aspects, the primary controller is configured to determine whether the parking brake control is actuated based on a signal received from the parking brake control, determine whether the measured vehicle speed is approximately non-zero, and in response to determining that the measured vehicle speed is approximately non-zero while parking brake control provide a signal to the secondary controller indicating that the parking brake control is actuated, and the secondary controller is configured to determine that the vehicle is at speed while the parking brake control is actuated by receiving the signal from the primary controller indicating that the vehicle is travelling at a non-zero speed while the parking brake control is actuated.

In some aspects, the primary controller determines that the vehicle is at speed based on a signal received from the sensor indicating that the measured vehicle speed is approximately non-zero.

In some aspects, the secondary controller determines that vehicle is at speed based on a signal received from the primary controller indicating that the measured vehicle speed is approximately non-zero.

In some aspects, the secondary controller is configured to determine that the vehicle is at speed while the parking brake control is actuated by receiving a signal from the parking brake control indicating that the parking brake control is actuated and determining that the measured vehicle speed of the vehicle is approximately non-zero.

In some aspects, the parking brake includes a motor-on-caliper parking brake.

Another example provides a method for controlled deceleration for parking a vehicle having a parking brake, a primary hydraulic system, and a secondary hydraulic system. The method includes measuring, with a sensor, a speed of the vehicle, and outputting, with the sensor, a measured vehicle speed. The method also includes determining, with a secondary controller, whether the vehicle is travelling at an approximately non-zero speed while a parking brake control is actuated, in response to determining that the vehicle is travelling at an approximately non-zero speed while the parking brake control is actuated, determining, with the secondary controller, whether hydraulic braking using the primary hydraulic system is available, and in response to determining that hydraulic braking using the primary hydraulic system is not available, controlling, with the secondary controller, a secondary hydraulic pressure generator to generate hydraulic braking pressure. The primary hydraulic system includes a primary controller and a primary hydraulic pressure generator, and the secondary hydraulic system includes the secondary controller and the secondary hydraulic pressure generator.

In some aspects, the primary hydraulic system includes an electronic stability control system, and the primary controller includes an electronic stability controller.

In some aspects, the secondary hydraulic system includes an electronic brake booster, and the secondary controller includes a decoupled power brake controller.

In some aspects, the method includes determining, with the secondary controller based on a signal received from the primary controller indicative of a measured speed of the vehicle, whether the measured vehicle speed is approximately zero, and in response to determining that the measured vehicle speed is approximately zero, controlling, with the secondary controller, the parking brake to brake the vehicle.

In some aspects, determining, with the secondary controller, that hydraulic braking using the primary hydraulic system is not available is performed based on a signal received from the primary controller indicating a fault condition associated with the primary hydraulic system.

In some aspects, determining, with the secondary controller, that hydraulic braking using the primary hydraulic system is not available is performed in response to the secondary controller receiving no signal from the primary controller.

In some aspects, the method includes determining, with the primary controller, whether the parking brake control is actuated based on a signal received from the parking brake control, determining, with the primary controller, whether the measured vehicle speed is approximately non-zero, and in response to determining that the measured vehicle speed is approximately non-zero while parking brake control, providing, with the primary controller, a signal to the secondary controller indicating that the vehicle is travelling at a non-zero speed while the parking brake control is actuated. Determining, with the secondary controller, that the vehicle is at speed while the parking brake control is actuated includes receiving the signal from the primary controller indicating the vehicle is travelling at a non-zero speed while the parking brake control is actuated.

In some aspects, determining, with the primary controller, that the measured vehicle speed is approximately non-zero includes receiving a signal from the sensor indicating that the measured vehicle speed is approximately non-zero.

In some aspects, determining, with the secondary controller, that the vehicle is at speed is performed based on a signal received from the primary controller indicating that the measured vehicle speed is approximately non-zero.

In some aspects, the parking brake includes a motor-on-caliper parking brake.

DETAILED DESCRIPTION

Before any aspects, features, or instances are explained in detail, it is to be understood that the aspects, features, or instances are not limited in their application to the details of construction and the arrangement of components set forth in the following description or illustrated in the following drawings. Other instances are possible and are capable of being practiced or of being carried out in various ways.

Also, it is to be understood that the phraseology and terminology used herein is for the purpose of description and should not be regarded as limiting. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software based devices, as well as a plurality of different structural components may be utilized to implement the invention. For example, "control units" and "controllers" described in the specification can include one or more electronic processors, one or more memory modules including a non-transitory computer-readable medium, one or more input/output interfaces, and various connections (for example, a system bus) connecting the components. It should be understood that although certain drawings illustrate hardware and software located within particular devices, these depictions are for illustrative purposes only. In some instances, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

Figure 1:
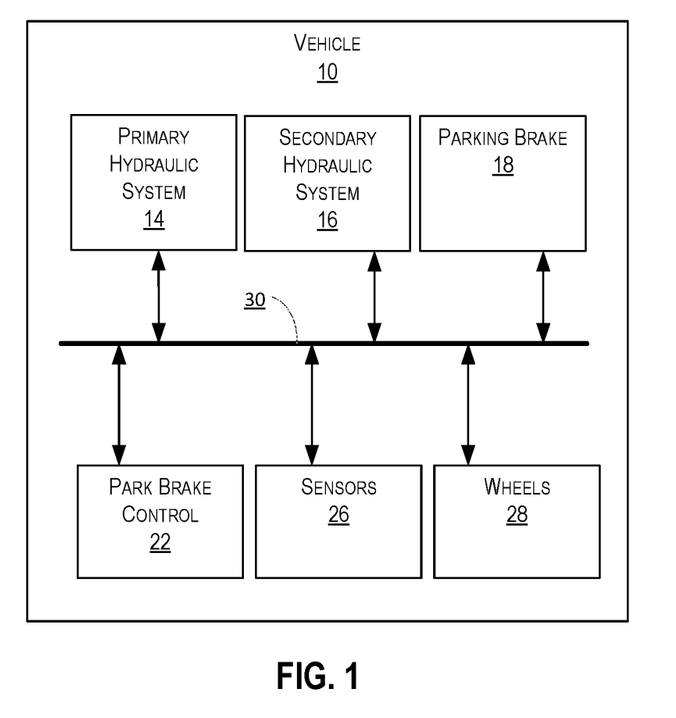
FIG. 1 is a schematic illustration of a vehicle that includes certain vehicle systems, according to some aspects.

FIG. 1 schematically illustrates a vehicle 10, according to some aspects. In some instances, the vehicle 10 is an autonomous vehicle. The term "autonomous vehicle" is used in an inclusive way to refer to an autonomous or partially autonomous vehicle, which possesses varying degrees of automation (that is, the vehicle is configured to drive itself with limited, or in some cases no, input from a driver). The term "driver," as used herein, generally refers to an occupant of a vehicle, who operates the controls of the vehicle or provides control input to the vehicle to influence the operation of the vehicle. However, in some instances, the vehicle 10 is not an autonomous vehicle.

In the illustrated example, the vehicle 10 includes a primary hydraulic system 14, a secondary hydraulic system 16 (described in greater detail below with respect to FIGS. 2-5), a parking brake 18, a parking brake control 22, a plurality of sensors 26, and wheels 28. The components of the vehicle 10, along with other various modules and components are electrically and communicatively coupled to each other via direct connections or by or through one or more control or data buses (for example, the bus 30), which enable communication therebetween. In some instances, the bus 30 is a controller area network (CAN) bus. In some instances, the bus 30 is an automotive Ethernet, a FlexRay™ communications bus, or another suitable bus. In alternative instances, some or all of the components of the vehicle 10 may be communicatively coupled using suitable wireless modalities (for example, Bluetooth™ or near field communication connections).

The parking brake 18 includes, for example, a motor-on-caliper braking mechanism operable to brake the rear wheels of the vehicle 10 while the vehicle 10 is at a standstill. The parking brake 18 may be activated in response to user actuation of the parking brake control 22. The parking brake control 22 is an electronic parking brake (EPB) control device (e.g., a button, a knob, a switch, or similar device) included in the vehicle in lieu of, or in addition to, a traditional handbrake lever. In some instances, the parking brake control 22 is implemented in a touch screen included in the vehicle 10 (e.g., a liquid crystal display (LCD) touch screen, an organic light-emitting diode (OLED) touch screen, etc.). The parking brake 18 is activated in response to user operation of the parking brake control 22.

The sensors 26 measure one or more attributes of the vehicle 10 and the environment around the vehicle 10 and communicate information regarding those attributes to the other components of the vehicle 10 using, for example, messages transmitted on the bus 30. The sensors 26 may include, for example, sensors that detect accelerator pedal position and brake pedal position, wheel speed sensors, steering angle sensors, vehicle speed sensors, yaw, pitch, and roll sensors, Hall effect sensors, force sensors, torque sensors, rotor position sensors, and vehicle proximity sensors (for example, ultrasonic). In some instances, the sensors 26 are similar to sensor sets used in an electronic stability control (ESC) system and similar vehicle control systems.

The wheels 28 include at least two wheels 28 (e.g., at least one front wheel and at least one rear wheel). However, the wheels 28 may include more than two wheels. For example, the wheels 28 may include two front wheels and two rear wheels.

Figure 2:
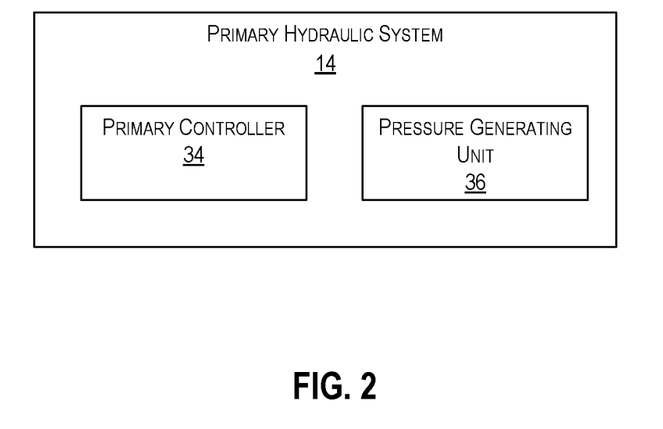
FIG. 2 illustrates a primary hydraulic system included in the vehicle of FIG. 1, according to some aspects.

FIG. 2 illustrates the primary hydraulic system 14 according to some examples. In one example, the primary hydraulic system 14 includes a primary controller 34 and a primary pressure generating unit 36. The primary hydraulic system 14 includes, for example, an electronic stability control (ESC) system. The primary controller 34 includes, for example, an electronic stability controller. The primary controller 34 receives sensor data from the plurality of sensors 26 and determines control commands for the primary hydraulic system 14, the secondary hydraulic system 16, the parking brake 18, and/or other vehicle control systems included in the vehicle 10. In some instances, the primary controller 34 is part of one or more electronic processors that implement control of the vehicle 10. The primary pressure generating unit 36 generates hydraulic pressure according to commands received from the primary controller 34. It should be understood that the primary hydraulic system 14 may include additional components than those illustrated in FIG. 3 and in various configurations.

Figure 3:
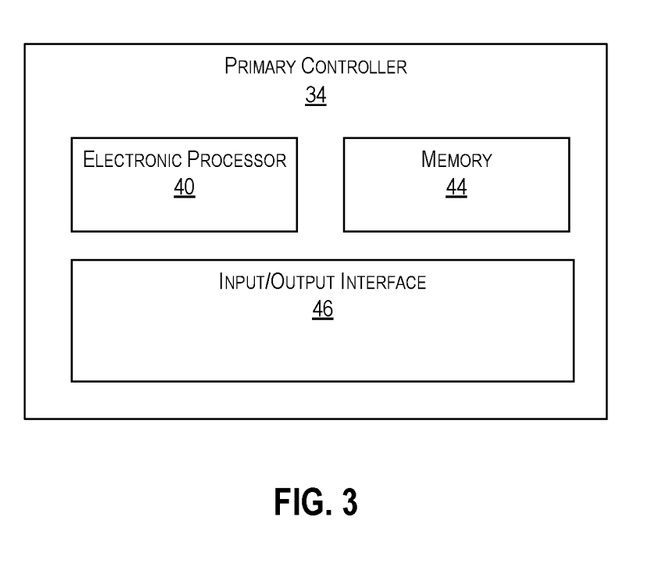
FIG. 3 illustrates a primary controller included in the primary hydraulic system of FIG. 2, according to some aspects.

Referring now to FIG. 3, the primary controller 34 includes a primary electronic processor 40 (for example, a microprocessor, application specific integrated circuit, etc.), a primary memory 44, and a primary input/output interface 46. The primary memory 44 may be made up of one or more non-transitory computer-readable media and includes at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The primary electronic processor 40 is coupled to the primary memory 44 and the primary input/output interface 46. The primary electronic processor 40 sends and receives information (for example, from the primary memory 44 and/or the primary input/output interface 46) and processes the information by executing one or more software instructions or modules, capable of being stored in the primary memory 44, or another non-transitory computer readable medium. The software can include firmware, one or more applications, program data, filters, rules, one or more program modules, and other executable instructions.

The primary electronic processor 40 is configured to retrieve from the primary memory 44 and execute, among other things, software for performing methods as described herein. The primary input/output interface 46 transmits and receives information from devices external to the primary controller 34 (for example, components of the vehicle 10 via the bus 30). It should be understood that the primary controller 34 may include additional components than those illustrated in FIG. 3 and in various configurations. For example, in some examples, the primary controller 34 includes multiple primary electronic processors 40, multiple primary memory modules 44, multiple primary input/output interfaces 46, or a combination thereof.

The primary electronic processor 40 calculates or determines hydraulic pressure requirements based on sensor data received from the plurality of sensors 26, as well as user input from the driver of the vehicle 10 (e.g., via the vehicle brakes, the steering wheel, the parking brake actuator 22, etc.). In one example, the primary electronic processor 40 determines that a first amount of hydraulic pressure is required on at the brake of the front left wheel of the vehicle 10, and a second amount of hydraulic pressure is required at the brake of the front right wheel of the vehicle 10. In one example, the primary electronic processor 40 also receives a signal indicating that the parking brake control 22 has been actuated while the vehicle 10 is travelling at a non-zero speed, and generates a command to the primary pressure generating unit 36 to generate braking pressure for decelerating the vehicle 10 to a standstill for parking.

Figure 4:
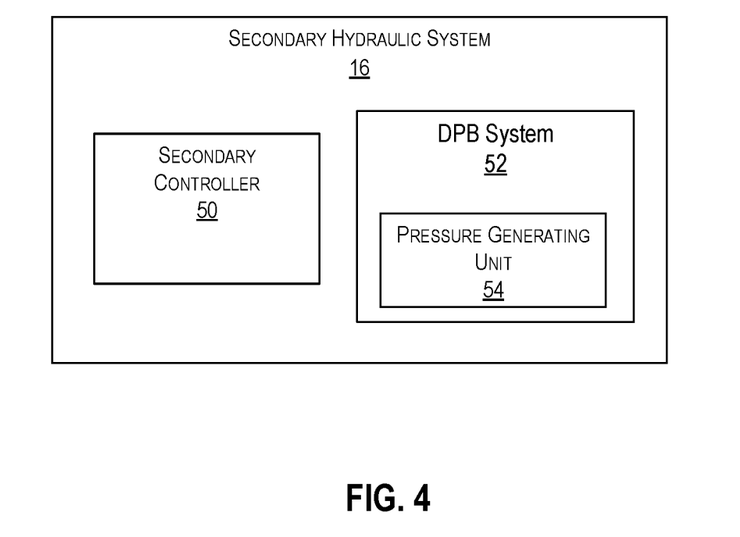
FIG. 4 illustrates a secondary hydraulic system included in the vehicle of FIG. 1. according to some aspects.

FIG. 4 illustrates the secondary hydraulic system 16 according to some examples. The secondary hydraulic system 16 includes a secondary controller 50 and a secondary pressure generating unit 54. The secondary hydraulic system 16 includes a decoupled power brake (DPB) system 52 having a secondary pressure generating unit 54. The secondary pressure generating unit 54 may include, for example an electronic brake booster having an accumulator that stores pressurized brake fluid.

The secondary controller 50 is a controller separate from a primary controller 34 that performs calculations for amplifying brake force. The secondary controller includes, for example, a decoupled power brake controller. The secondary controller 50 may receive sensor data from the plurality of sensors 26 and determine control commands for the secondary hydraulic system 16, the parking brake 18, and/or other vehicle control systems included in the vehicle 10. In some instances, the secondary controller 50 is part of one or more electronic processors that implement control of the vehicle 10. In some instances, the secondary controller 50 receives control commands from the primary controller 34.

The secondary pressure generating unit 54 generates hydraulic pressure according to commands received from the secondary controller 50. It should be understood that the secondary hydraulic system 16 may include additional components than those illustrated in FIG. 4 and in various configurations.

Figure 5:
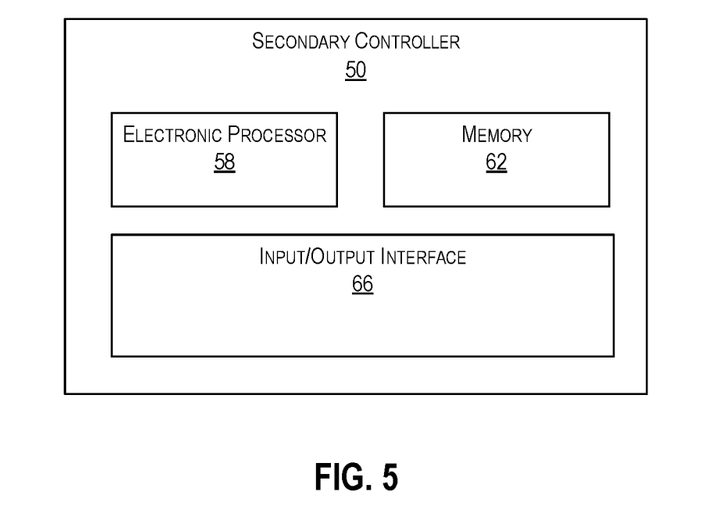
FIG. 5 illustrates a secondary controller included in the secondary hydraulic system of FIG. 4, according to some aspects.

Referring now to FIG. 5, the secondary controller 50 includes a secondary electronic processor 58 (for example, a microprocessor, application specific integrated circuit, etc.), a secondary memory 62, and a secondary input/output interface 66. The secondary memory 62 may be made up of one or more non-transitory computer-readable media and includes at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The secondary electronic processor 58 is coupled to the secondary memory 62 and the secondary input/output interface 66. The secondary electronic processor 58 sends and receives information (for example, from the secondary memory 62 and/or the secondary input/output interface 66) and processes the information by executing one or more software instructions or modules, capable of being stored in the secondary memory 62, or another non-transitory computer readable medium. The software can include firmware, one or more applications, program data, filters, rules, one or more program modules, and other executable instructions.

In some examples, the secondary electronic processor 58 is configured to retrieve from the secondary memory 62 and execute, among other things, software for performing methods as described herein. The secondary input/output interface 66 transmits and receives information from devices external to the secondary controller 50 (for example, components of the vehicle 10 via the bus 30). In some instances, the secondary input/output interface 66 transmits and receives information and commands from the primary electronic processor 40. It should be understood that the secondary controller 50 may include additional components than those illustrated in FIG. 5 and in various configurations. For example, in some examples, the secondary controller 50 includes multiple secondary electronic processors 58, multiple secondary memory modules 62, multiple secondary input/output interfaces 66, or a combination thereof.

The secondary electronic processor 58 calculates or determines hydraulic pressure requirements based on sensor data received from the plurality of sensors 26, as well as user input from the driver of the vehicle 10 (e.g., via the vehicle brakes, the steering wheel, the parking brake actuator 22, etc.). In one example, the secondary electronic processor 58 determines that an amount of hydraulic pressure is required at the wheels 28 of the vehicle 10. The secondary electronic processor 58 transmits requests for hydraulic pressure to the secondary pressure generating unit 54.

Figure 6:
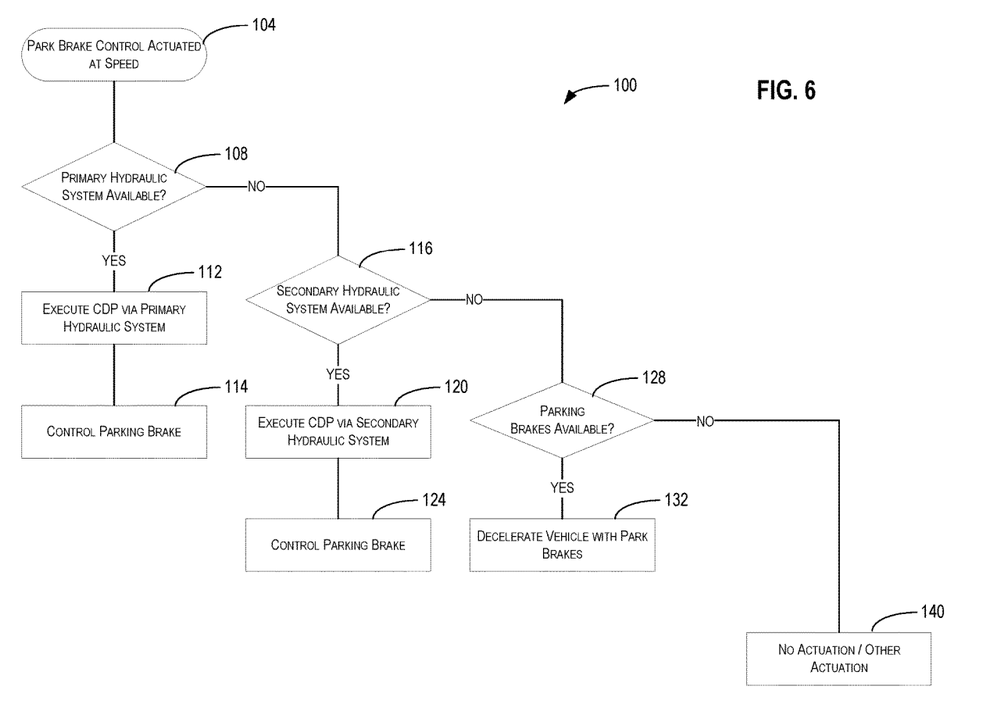
FIG. 6 illustrates a method for executing controlled deceleration for parking, according to some aspects.

FIG. 7 illustrates an example method 100 for executing controlled deceleration for parking of the vehicle 10, according to some aspects. The method 100 includes generating a signal with the parking brake control 22 indicating that the parking brake control 22 has been actuated (e.g., by the driver of the vehicle 10) (at block 104). The signal indicating actuation of the parking brake control 22 is received by at least one controller in the vehicle 10, for example, the primary electronic processor 40, the secondary electronic processor 58, or another vehicle controller in the vehicle 10. In some instances, the signal may be received by multiple controllers in the vehicle 10. One or more of the controllers in the vehicle 10 (e.g., the primary electronic processor 40) determines whether the vehicle 10 is travelling at a non-zero speed when the parking brake control 22 is actuated.

The method 100 includes determining whether the primary hydraulic system 14 is available (at block 108). For example, the primary electronic processor 40 may output a fault signal when a fault is detected in one or more components of the primary hydraulic system 14 that prevents the primary hydraulic system 14 from providing the requested braking pressure. For example, the fault may include a fault in the primary controller 34, a fault in the primary pressure generating unit 36 (e.g., a fault in a pump, a valve, a pump motor, etc.), or a combination thereof When at block 108, the primary hydraulic system 14 is available, the primary hydraulic system 14 executes controlled deceleration for parking of the vehicle 10 (at block 112). For example, the primary electronic processor 40 determines an amount of hydraulic pressure required at each of the wheels 28 of the vehicle 10 for bringing the vehicle 10 to a standstill, for example, within a predetermined period of time and/or at a predetermined amount of deceleration.

When the vehicle 10 is at a standstill (e.g., when the primary electronic processor 40 determines that the measured speed of the vehicle 10 is approximately zero), the primary electronic processor 40 transmits a command the parking brake 18 to lock the vehicle 10 at a standstill (at block 114).

When, at block 108, the primary hydraulic system 14 is not available, for example, due to a fault in one or more components of the primary hydraulic system 14, the method 100 determines whether the secondary hydraulic system 16 is available (at block 116). In addition to providing electronic brake boosting, the secondary hydraulic system 16 operates as a backup to the primary hydraulic system 14 in the event of a failure in the primary hydraulic system 14 when the parking brake control 22 is actuated at speed. For example, the secondary electronic processor 58 may receive a signal from the primary electronic processor 40 indicating that the primary hydraulic system 14 is in a fault state. In some instances, the secondary electronic processor 58 determines that one or more components of the primary hydraulic system 14 is in a fault state in response to receiving no signal from the primary electronic processor 40. In some instances, the secondary electronic processor 58 receives a signal from the primary electronic processor 40 and/or the parking brake control 22 indicating that the parking brake control 22 has been actuated. In one example, the secondary electronic processor 58 determines that an absence of electronic communication from the primary electronic processor 40 is caused by a fault in the primary electronic processor 40.

Traditional vehicle braking systems rely on the parking brake 18 as the only backup to the primary hydraulic system 14. The parking brake 18 is typically only operable to apply braking force on the rear wheels of the vehicle 10 using a motor-on-caliper system, resulting in less stable braking of the vehicle 10 compared to the hydraulic braking normally provided by the primary hydraulic system 14. The parking brake 18 also provides a lower maximum achievable deceleration compared to the hydraulic braking provided by the primary hydraulic system 14.

Accordingly, when the secondary hydraulic system 16 is available (e.g., when a fault condition is not detected in one or more components of the secondary hydraulic system 16), the secondary hydraulic system 16 performs controlled deceleration for parking the vehicle 10. For example, the secondary electronic processor 58 determines an amount of hydraulic pressure required at the wheels 28 of the vehicle 10 for bringing the vehicle 10 to a standstill within a predetermined period of time and/or at a predetermined amount of deceleration. In some instances, the secondary electronic processor 58 determines the amount of braking pressure required by determining the measured speed of the vehicle 10. In some instances, the secondary electronic processor 58 determines the amount of braking pressure required based on a command received from the primary electronic processor 40 or from another vehicle controller.

When the vehicle 10 is at a standstill (e.g., when the secondary electronic processor 58 determines that the measured speed of the vehicle 10 is approximately zero), the secondary electronic processor 58 may transmit a command the parking brake 18 to lock the vehicle 10 at a standstill (at block 124).

The secondary hydraulic system 16 is operable to provide higher-reliability and more stable braking relative to the parking brake 18 when the parking brake control 22 is actuated at speed. Additionally, the secondary hydraulic system 16 provides an additional level of redundancy for braking the vehicle 10 in the event of a failure in the vehicle control systems.

When, at block 116, both the primary electronic processor 40 and the secondary electronic processor 58 output a fault signal when the parking brake control 22 is actuated at speed, the method 100 determines whether the parking brake 18 is available. When at block 128, the parking brake 18 is available when neither the primary hydraulic system 14 nor the secondary hydraulic system 16 is available and the parking brake control 22 is actuated at speed, the parking brake 18 performs deceleration of the vehicle 10 (at block 132). For example, the primary electronic processor 40 or another controller in the vehicle 10 may output a control signal to the parking brake 18 for commanding the parking brake 18 to decelerate the vehicle 10. In some instances, when the parking brake 18 is not available (at block 128), the primary electronic processor 40 provides a command to another vehicle system (e.g., a drive train) for decelerating the vehicle 10.

Thus, aspects herein provide, among other things, systems and methods for controlled deceleration for parking a vehicle.

What is claimed is:

1. A system for a vehicle, the system comprising:
   a parking brake control;
   a sensor configured to measure a speed of the vehicle and output a measured vehicle speed;
   a parking brake;
   a primary hydraulic system including a primary controller and a primary hydraulic pressure generator; and
   a secondary hydraulic system including a secondary controller and a secondary hydraulic pressure generator;
   wherein
   the secondary controller is configured to
      determine whether the vehicle is travelling at a non-zero speed while the parking brake control is actuated,
      in response to determining that the vehicle is travelling at a non-zero speed while the parking brake control is actuated, determine whether hydraulic braking using the primary hydraulic system is available, and
      in response to determining that hydraulic braking using the primary hydraulic system is not available, control the secondary hydraulic pressure generator to generate hydraulic braking pressure.

2. The system of claim 1, wherein
   the primary hydraulic system includes an electronic stability control system, and
   the primary controller includes an electronic stability controller.

3. The system of claim 1, wherein
   the secondary hydraulic system includes an electronic brake booster, and
   the secondary controller includes a decoupled power brake controller.

4. The system of claim 1, wherein
   the secondary controller is further configured to
      determine, based on a signal received from the primary controller indicative of a measured speed of the vehicle, whether the measured vehicle speed is approximately zero, and
      in response to determining that the measured vehicle speed is approximately zero, control the parking brake to brake the vehicle.

5. The system of claim 1, wherein
   the secondary controller is configured to determine that hydraulic braking using the primary hydraulic system is not available based on a signal received from the primary controller indicating a fault condition for the primary hydraulic system.

6. The system of claim 1, wherein
   the secondary controller is configured to determine that hydraulic braking using the primary hydraulic system is not available in response to receiving no signal from the primary controller.

7. The system of claim 1, wherein
   the primary controller is configured to
      determine whether the parking brake control is actuated based on a signal received from the parking brake control,
      determine whether the measured vehicle speed is approximately non-zero, and
      in response to determining that the measured vehicle speed is approximately non-zero while parking brake control, provide a signal to the secondary controller indicating that the vehicle is travelling at a non-zero speed while the parking brake control is actuated, and
   the secondary controller is configured to determine that the vehicle is at speed while the parking brake control is actuated by receiving the signal from the primary controller indicating that the vehicle is travelling at a non-zero speed while the parking brake control is actuated.

8. The system of claim 7, wherein
   the primary controller determines that the vehicle is at speed based on a signal received from the sensor indicating that the measured vehicle speed is approximately non-zero.

9. The system of claim 1, wherein
   the secondary controller determines that vehicle is at speed based on a signal received from the primary controller indicating that the measured vehicle speed is approximately non-zero.

10. The system of claim 1, wherein
    the parking brake includes a motor-on-caliper parking brake.

11. A method for controlled deceleration for parking a vehicle having a parking brake, a primary hydraulic system, and a secondary hydraulic system, the method comprising:
    measuring, with a sensor, a speed of the vehicle;
    outputting, with the sensor, a measured vehicle speed;
    determining, with a secondary controller, whether the vehicle is travelling at an approximately non-zero speed while a parking brake control is actuated;
    in response to determining that the vehicle is travelling at an approximately non-zero speed while the parking brake control is actuated, determining, with the secondary controller, whether hydraulic braking using the primary hydraulic system is available; and in response to determining that hydraulic braking using the primary hydraulic system is not available, controlling, with the secondary controller, a secondary hydraulic pressure generator to generate hydraulic braking pressure, wherein the primary hydraulic system includes a primary controller and a primary hydraulic pressure generator, and the secondary hydraulic system includes the secondary controller and the secondary hydraulic pressure generator.

12. The method of claim 11, wherein
the primary hydraulic system includes an electronic stability control system, and
the primary controller includes an electronic stability controller.

13. The method of claim 11, wherein
the secondary hydraulic system includes an electronic brake booster, and
the secondary controller includes a decoupled power brake controller.

14. The method of claim 11, further comprising:
determining, with the secondary controller based on a signal received from the primary controller indicative of a measured speed of the vehicle, whether the measured vehicle speed is approximately zero, and
in response to determining that the measured vehicle speed is approximately zero, controlling, with the secondary controller, the parking brake to brake the vehicle.

15. The method of claim 11, wherein
determining, with the secondary controller, that hydraulic braking using the primary hydraulic system is not available is performed based on a signal received from the primary controller indicating a fault condition for the primary hydraulic system.

16. The method of claim 11,
determining, with the secondary controller, that hydraulic braking using the primary hydraulic system is not available is performed in response to the secondary controller receiving no signal from the primary controller.

17. The method of claim 11, further comprising:
determining, with the primary controller, whether the parking brake control is actuated based on a signal received from the parking brake control; and
determining, with the primary controller, whether the measured vehicle speed is approximately non-zero;
in response to determining that the measured vehicle speed is approximately non-zero while parking brake control, providing, with the primary controller, a signal to the secondary controller indicating that the vehicle is travelling at a non-zero speed while the parking brake control is actuated,
wherein determining, with the secondary controller, that the vehicle is at speed while the parking brake control is actuated includes receiving the signal from the primary controller indicating the vehicle is travelling at a non-zero speed while the parking brake control is actuated.

18. The system of claim 7, wherein
determining, with the primary controller, that the measured vehicle speed is approximately non-zero includes receiving a signal from the sensor indicating that the measured vehicle speed is approximately non-zero.

19. The method of claim 11, wherein
determining, with the secondary controller, that the vehicle is at speed is performed based on a signal received from the primary controller indicating that the measured vehicle speed is approximately non-zero.

20. The method of claim 11, wherein
the parking brake includes a motor-on-caliper parking brake, and
wherein the secondary hydraulic pressure generator is separate from primary hydraulic pressure generator.

* * * * *